Figure 4:
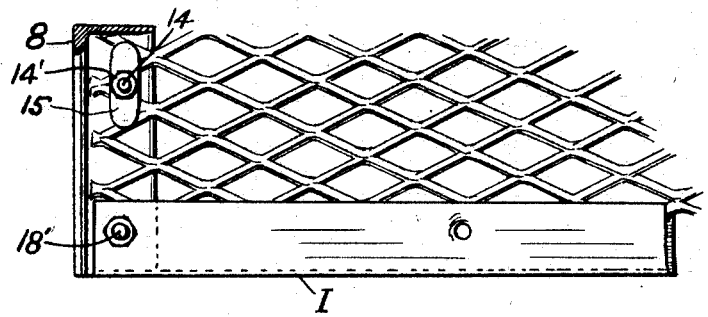

T. R. HERBEST, Jr.
GUARD DEVICE.
APPLICATION FILED MAR. 15, 1919.
1,388,644.
Patented Aug. 23, 1921.
3 SHEETS—SHEET 1.
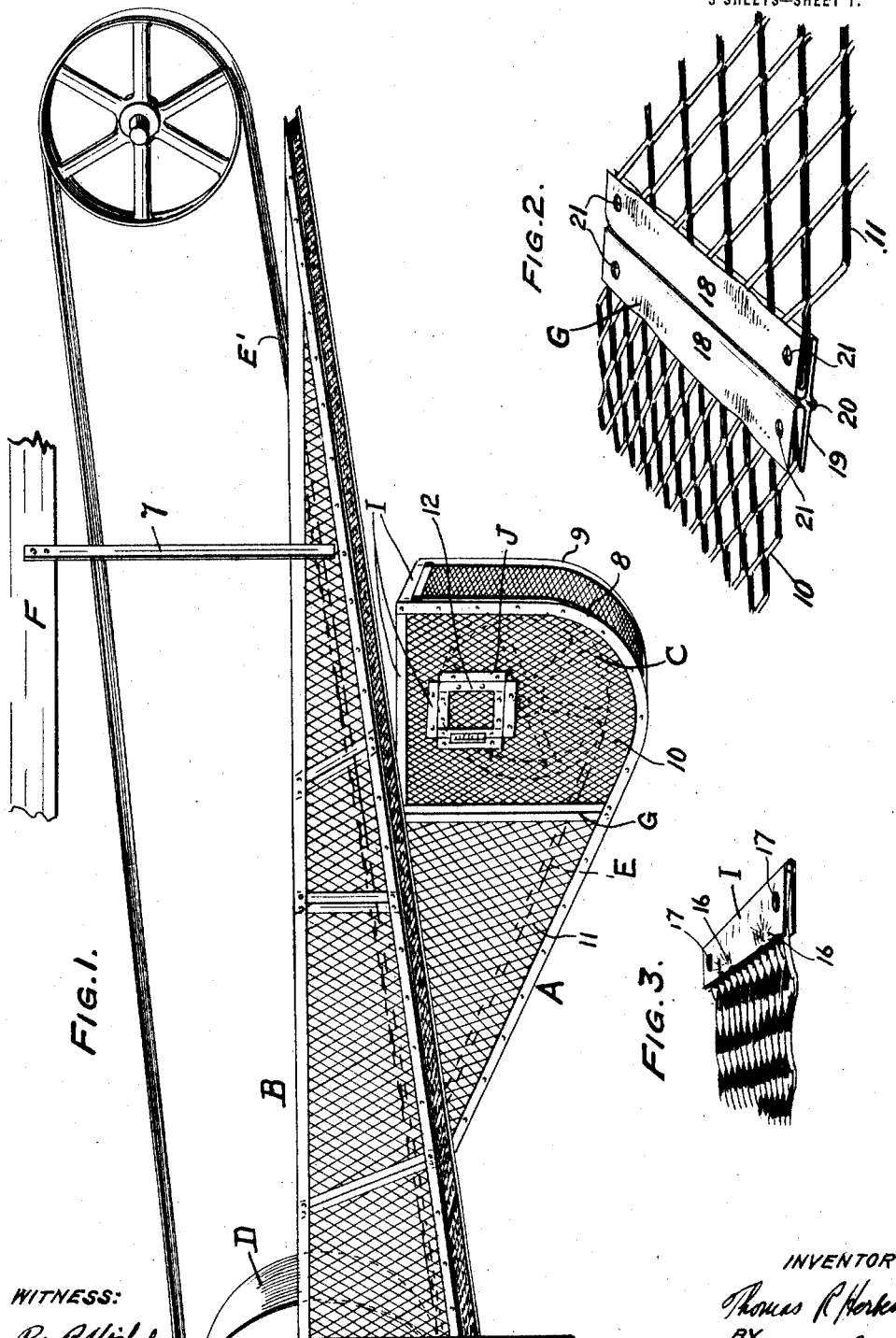
WITNESS:
INVENTOR
BY
ATTORNEYS.

T. R. HERBEST, Jr.
GUARD DEVICE.
APPLICATION FILED MAR. 15, 1919.

1,388,644.

Patented Aug. 23, 1921.
3 SHEETS—SHEET 2.

WITNESS:

INVENTOR
Thomas R Herbest Jr.
BY
ATTORNEYS.

T. R. HERBEST, Jr.
GUARD DEVICE.
APPLICATION FILED MAR. 15, 1919.

1,388,644.

Patented Aug. 23, 1921.
3 SHEETS—SHEET 3.

UNITED STATES PATENT OFFICE.

THOMAS R. HERBEST, JR., OF PHILADELPHIA, PENNSYLVANIA, ASSIGNOR TO CONSOLIDATED EXPANDED METAL COMPANY, OF BRADDOCK, PENNSYLVANIA, A CORPORATION OF PENNSYLVANIA.

GUARD DEVICE.

1,388,644.   Specification of Letters Patent.   Patented Aug. 23, 1921.

Application filed March 15, 1919. Serial No. 282,970.

*To all whom it may concern:*

Be it known that I, THOMAS R. HERBEST, Jr., a citizen of the United States, residing at Philadelphia, in the county of Philadelphia and State of Pennsylvania, have invented certain new and useful Improvements in Guard Devices, of which the following is a specification.

This invention relates to guard devices and the like, and it will be best understood from a brief statement of the requirements to be met and the practical considerations to be satisfied.

Owing to the recent working mens' compensation statutes, the requirements of the insurance underwriter with respect to guard devices for machinery and moving parts have become quite rigid. The requirements with respect to mesh guard devices, in connection with which this invention is most useful, will only be considered. The mesh must be sufficiently rigid to prevent deflection or bending in toward the moving parts and the guard must be spaced away from the moving parts, the spacing depending upon the character of the hazard. If the hazard is great the guard must be spaced quite a distance away from the rotating parts or moving parts, and if the hazard is less great, the guard may be located closer to such parts. The size of the mesh is also dependent upon the character of the hazard, in some cases a very fine mesh being required, particularly where the fingers may be accidentally thrust into the moving parts, while in other cases the requirements are satisfied by a much larger mesh. Among the practical considerations, attention is directed to the fact that the size and shape of the guards and of various portions thereof, greatly vary, so that frequently a large loss of material is entailed. The necessity of utilizing different sizes of mesh, also presents practical difficulties.

It is the purpose of my invention to provide an improved guard device of simple character, which meets and satisfies the foregoing requirements and conditions together with such others as may hereinafter appear or are readily understood in this art. I propose to provide an improved guard device which is of such character as to make it possible to construct the guards of minimum size, thereby effecting saving in material; to construct the guard devices from lighter material than heretofore possible, to facilitate the joinder of sections of different mesh; to increase the strength and rigidity of the guard without encroaching upon the available space; and in general to provide improved means, very simple in character, adapted to satisfactorily meet the various requirements and conditions arising in practice.

Figure 5:
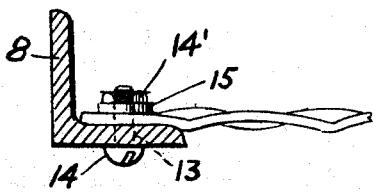
Figure 6:
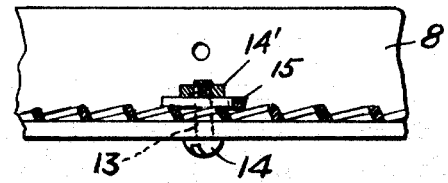
Figure 7:
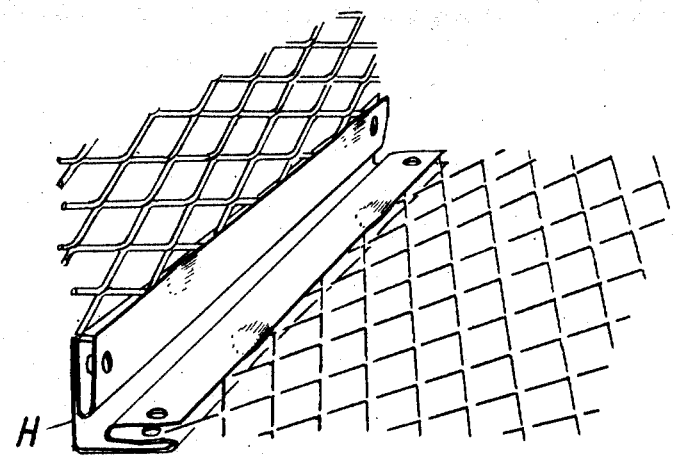
Figure 8:
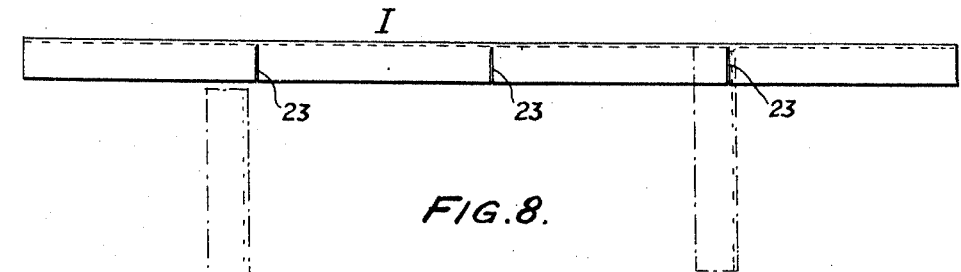
Figure 9:
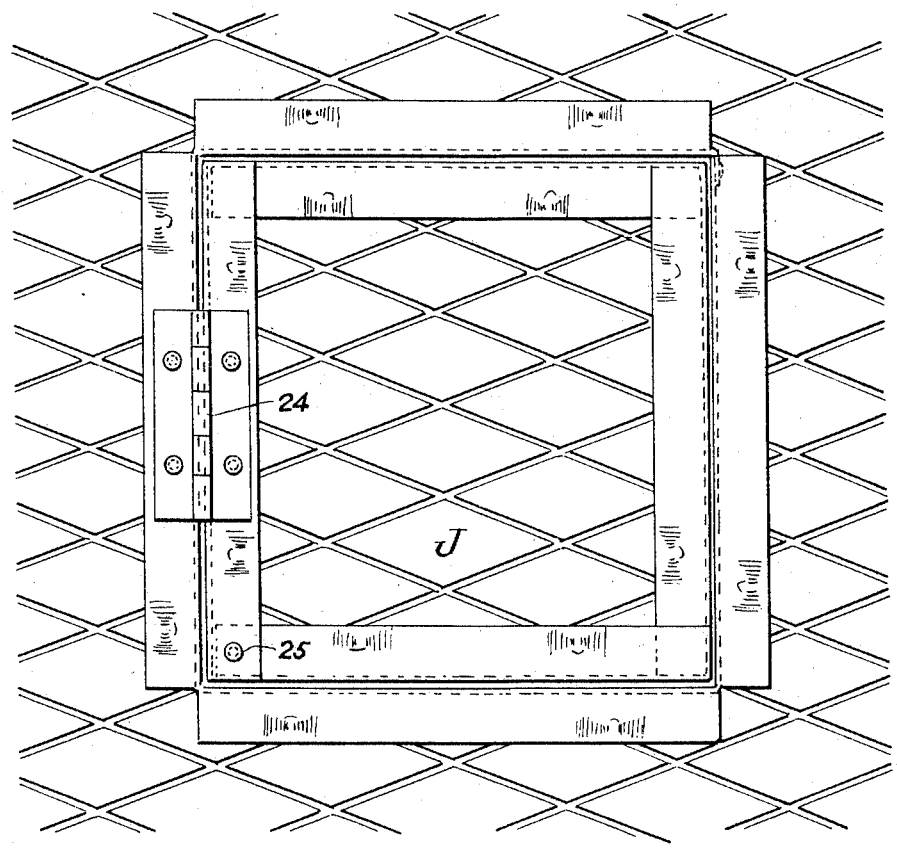

I accomplish the foregoing together with such other objects as may hereinafter appear, by means of a construction which I have illustrated in preferred form in the accompanying drawings wherein:

Figure 1 is a perspective view illustrating the application of two guard devices to belt transmission means; Fig. 2 is a perspective view showing a splice bar suitable for joining sections of different mesh; Fig. 3 is a perspective view showing an improved member adapted to cover over the ragged edges of a section of the expanded or other form of meshed material utilized; such member acting as a reinforcing member and also as a portion of the frame work of the guard; Fig. 4 is a sectional view illustrating the manner of securing the meshed fabric and the reinforcing member of Fig. 3 in position; Fig. 5 is another cross sectional view illustrating the manner of attaching the mesh to the frame of the guard; Fig. 6 is an end elevation of Fig. 5; Fig. 7 is a perspective view showing a modified form of corner angles; Fig. 8 is a view showing how the reinforcing bar shown in Fig. 3 may be cut for bending into frames suitable for hand holes; and Fig. 9 is a side elevation of such a hand hole frame and door.

Referring now to Fig. 1, it will be seen that I have therein shown two guard devices, generally indicated as a whole at A and B respectively, such guard devices being suitable for use in connection with belt-power transmission means. The guard A protects the lower pulley C and the belt E and the upper guard device B protects the pulley D and the belt E'. The guard devices are supported from suitable over-head frame work F, by hanger means such as the bracket or angle piece 7.

The guard device A comprises two corner angle pieces 8 and 9 such as illustrated in cross section in Fig. 5 for example, the angles being bent into the desired shape. Secured to each angle, in the manner hereinafter described, is a sheet or section of expanded metal 10, adapted to protect the pulley C, such sheets, having a very fine mesh because the hazard is great. The sheets 10 extend to the splice bars G which are secured to the angles 8 and 9 in the manner hereinafter to be described. From the splice bar G, the guard A is provided with two side sheets of expanded metal 11, having a much larger mesh than the sheets 10, the hazard being less. The sheets 11 protect the belt E. The bottom of the guard is closed by a sheet (not shown), similar to the sheets 10, such sheet being secured to the angles 8 and 9 in the same manner as sheets 10. Such sheet closes the bottom of the guard to a point adjacent the splice bar G, and from this point rearwardly and upwardly, the bottom of the guard is closed by a sheet of expanded metal (not shown) of the same size mesh as the side sheets 11. These two bottom sheets are also joined by splice bar G (not shown). The front of the guard A is closed by a hinged door 12, to be later described. The top of the guard is open, there being no necessity for closing the same. The top frame members of the guard are comprised of the reinforcing bars I, which serve to cover up the ragged ends of the sheets 10 and 11. The frame for the door 12 is also comprised of such reinforcing bars I. The detailed construction will now be described.

Attention is first directed to Figs. 4, 5, and 6 which illustrate the manner of securing the sections of expanded metal to the angle bars 8 and 9. At various intervals the angle bars are provided with apertures 13 adapted to receive the screws (bolts or rivets) 14, such screws being of a length sufficient to project beyond the expanded metal. The screws 14 pass through apertures in the elongated buttons 15, and when the nuts 14' are tightened the expanded metal fabric will be drawn tightly against the angles, and securely held by the buttons.

The side sheets 10 and 11 and the bottom sheets (not shown) are secured to the angles 8 and 9 in this manner.

The top frame members I of the guard A, which serve to cover over the ragged ends of the expanded metal fabric sheets are best shown in Fig. 3, from inspection of which it will be seen that they are U-shaped bars, of relatively thin sheet steel, between the limbs of which there is sufficient space to permit of the bar being slipped over the edge of the fabric, or vice versa, the edge of the fabric inserted into the bar. The fabric is secured in the bar by crimping in the metal as diagrammatically indicated at 16. This may be conveniently done by punching or hammering the metal into the spaces or diamond-shaped openings in the fabric. When thus crimped or pinched, the bar securely holds the fabric and at the same time acts as a rigid frame member, constituting a part of the frame work of the guard. The guard being of relatively thin metal, it will be apparent that a single size is adapted to fit fabric made from metal of different gages, for the bar may be readily compressed in size so as to fit the particular fabric. At the ends, the bars I are provided with apertures 17 adapted to receive screws or bolts 18' (see Fig. 4) by means of which they are rigidly secured to the angle frame members 8 and 9.

An important advantage incident to this type of reinforcing bar is that it does not encroach upon the space between the guard and the part to be protected. In this connection its advantages over angle iron will be readily apparent. About the smallest size of angle iron suitable for these uses would be ½" angle and the use of such an angle, assuming that the guard is rectangular, would involve increasing the dimensions of the guard 1" each way, and this in turn would greatly increase the areas of the sheets of fabric constituting the sides or walls of the guard. If the guard were circular, the uses of such an angle would increase the diameter of the guard 1", thus of course involving the increase of the area of the walls of the guard. By the use of my improved form of reinforcing bar, I am enabled to reduce the size of the guard to the lowest area possible and thus effect a great saving in the amount of material required. At the same time because of the construction of the reinforcing bar, and because of the crimping, it will be seen that the reinforcing bar is very rigid. In addition, the use of such a bar dispenses with the drilling of holes in the angle bar for attaching the expanded metal fabric thereto, and also dispenses with the necessity of providing screws and attaching buttons. Furthermore a more uniform structure is obtained, even though the guard is composed of a number of sheets of expanded metal of different sized meshes and composed of metal of different size gage.

Attention is now directed to Fig. 2 in which I have illustrated the splice bar suitable for use in joining sections of fabric of different mesh. The splice bar is formed from a single sheet of sheet steel bent to provide two oppositely disposed U bars 18, preferably lying in the same horizontal plane. The bars are connected by the web 19 which may have a reinforcing or strengthening rib or bead 20 in the center thereof extending longitudinally of the splice bar. The edges of the sheets of expanded fabric are inserted between the limbs of the U bars, as in the manner before described, and are secured in place by crimping or punching in the metal in the openings between the strands of the fabric. At the ends the splice bars are provided with one or more apertures 21 for the reception of bolts or screws utilized in securing the splice bar to the angle members or to the reinforcing bars I as the case may be. These splice bars have all of the advantages hereinbefore pointed out in connection with the reinforcing bars I, but in addition it will be readily seen that they are much more rigid. When secured in place they constitute portions of the frame work of the guard, and by their use I am enabled to employ fabric made from metal of a lighter gage because of the rigidity which these bars lend to the frame work of the guard.

Another important advantage incident to the use of both the reinforcing bars I and the splice bars G is, that I am enabled to use odds and ends of expanded metal sheets, which otherwise I might not be able to incorporate into a guard structure. This will be apparent from inspection of Fig. 1 and particularly the guard member B there illustrated. It will be noted that the side walls of this guard member are composed of a plurality of irregularly shaped small sheets of fabric. These odds and ends may be cut into any shape effecting an economy in material, and nevertheless be readily joined together and supported by the splice bar or by the reinforcing bars I.

Attention is now directed to Fig. 7 from inspection of which will be seen that I have there shown a modified form of angle H adapted to be used as a substitute for the angle irons 8 and 9. The sheets of fabric are secured in the angle irons in the manner heretofore described, and the angle is provided with any desired number of apertures to receive attaching screws and bolts.

The manner in which the reinforcing bars I may be utilized in constructing the frame work for hand hole doors, such for example as diagrammatically indicated at J in Fig. 1, will now be described, attention being directed to Figs. 8 and 9. The reinforcing bars at spaced intervals are partially cut through as indicated at 23, dividing the bar into sections joined by a thin web at the base of the bar. If the bar be now bent, by sections, into a rectangular shape, with the limbs of the U extending inwardly, a frame suitable for a door will result. Such a door frame is illustrated in Fig. 9. If now the section of the reinforcing bar be bent in the opposite direction, in the form of a rectangle, with the limbs of the U extending outwardly, a frame will result which is suitable for closing a hand hole opening. Such a frame is indicated in Fig. 9. The two frames may be suitably hinged together in any preferred manner as indicated diagrammatically in Fig. 9 at 24. The free ends of the door frame are bolted, riveted, or otherwise secured together as at 25, and the frame for the hand hole opening may have its free ends secured, as illustrated for example in Fig. 9, in the upper right hand corner thereof. It will be seen that these frames will have great rigidity and can be readily secured in place. The door 12 is also made with U-bars.

My invention is not strictly limited to its application to guard devices, but it is also applicable to analogous structures.

I claim:

1. A device suitable for guards and the like, comprising in combination a frame, a plurality of sheets of open mesh fabric, and means for splicing the fabric consisting of a member having oppositely disposed U shaped portions, said splicing member being provided with means for attachment to the frame.

2. A device suitable for guards and the like comprising in combination sheets of open mesh fabric and a member for joining the same comprising U shaped portions adapted to receive the fabric, said portions being compressible to fit the same, and said member having means whereby the same may be secured to an adjacent portion of the device to constitute a frame.

3. A device for guards comprising in combination expanded metal fabric and a U-shaped metallic edge member therefor adapted to receive an edge of the fabric, said edge member having portions coming over the mesh openings of the fabric pinched in to secure the member to the fabric, and the edge member further having means whereby it may be attached to an adjacent member of the device to constitute a guard frame.

In testimony whereof, I have hereunto signed my name.

THOS. R. HERBEST, JR.